US011319127B2

(12) United States Patent
Beyer et al.

(10) Patent No.: US 11,319,127 B2
(45) Date of Patent: May 3, 2022

(54) FASTENER FOR SECURING BUNDLED ARTICLES

(71) Applicant: A. Raymond et Cie, Grenoble (FR)

(72) Inventors: Mark Beyer, Armada, MI (US); James Nagle, Rochester, MI (US)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 17/068,929

(22) Filed: Oct. 13, 2020

(65) Prior Publication Data

US 2021/0024264 A1    Jan. 28, 2021

(51) Int. Cl.
*B65D 63/10* (2006.01)
*B65D 63/18* (2006.01)
*F16B 2/00* (2006.01)
*H02G 3/32* (2006.01)
*F16B 2/08* (2006.01)

(52) U.S. Cl.
CPC ......... *B65D 63/1063* (2013.01); *B65D 63/18* (2013.01); *F16B 2/005* (2013.01); *F16B 2/08* (2013.01); *H02G 3/32* (2013.01); *B65D 2563/103* (2013.01); *B65D 2563/108* (2013.01)

(58) Field of Classification Search
CPC .............. B65D 63/1063; B65D 63/18; B65D 2563/108; B65D 2563/103; F16B 2/005; F16B 2/08; F16B 21/086; H02G 3/32
See application file for complete search history.

(56) References Cited

U.S. PATENT DOCUMENTS

| 3,632,069 | A | * | 1/1972 | Thayer | ..................... H02G 3/32 |
| | | | | | 248/56 |
| 8,028,962 | B2 | | 10/2011 | Geiger | |
| 8,177,173 | B2 | | 5/2012 | Spiess | |
| 8,282,047 | B2 | | 10/2012 | Franks | |
| 9,190,821 | B2 | | 11/2015 | Kwasiborski | |
| 2005/0242247 | A1 | * | 11/2005 | Geiger | .................. F16L 3/2332 |
| | | | | | 248/74.3 |
| 2006/0239796 | A1 | | 10/2006 | Franks | |
| 2008/0035801 | A1 | | 2/2008 | Adams et al. | |
| 2010/0236030 | A1 | * | 9/2010 | Dyer | ....................... F16L 55/02 |
| | | | | | 24/16 PB |
| 2013/0119208 | A1 | * | 5/2013 | Geiger | .................. F16B 21/088 |
| | | | | | 248/68.1 |
| 2016/0223100 | A1 | * | 8/2016 | Geiger | .................. F16L 3/2332 |
| 2017/0059060 | A1 | * | 3/2017 | Gallion | ..................... H02G 3/32 |
| 2019/0331258 | A1 | | 10/2019 | Geiger et al. | |
| 2020/0318796 | A1 | * | 10/2020 | Schaub | ..................... F16B 2/08 |

\* cited by examiner

*Primary Examiner* — David M Upchurch
(74) *Attorney, Agent, or Firm* — Warner Norcross + Judd LLP

(57) ABSTRACT

A fastener for securing a bundle to a supporting structure includes a fastener body and a slip-resistant pad. The fastener body can include an article mount and a cable tie slot extending transversely through the article mount, the cable tie slot adapted to receive a cable tie. The mount provides support for a bundle and the slip-resistant pad is capable of friction with the bundle to resist axial movement and/or rotation of the bundle.

19 Claims, 9 Drawing Sheets

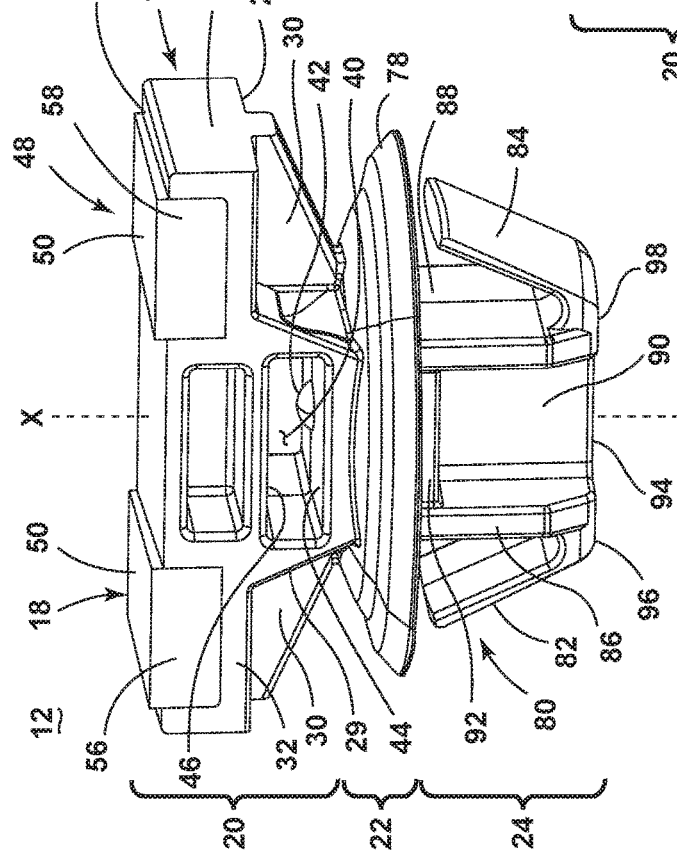
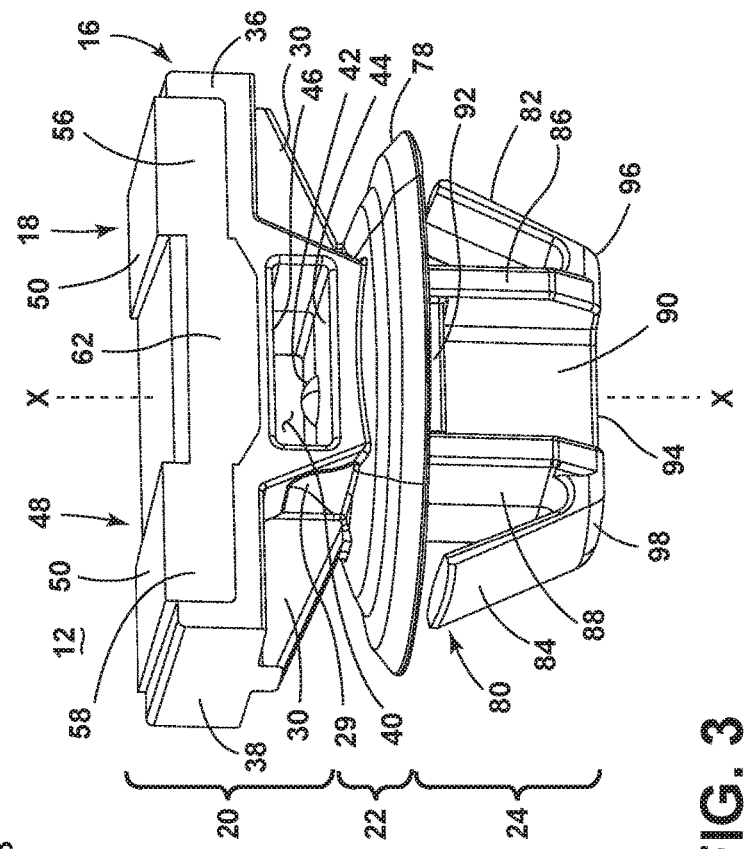
FIG. 2
FIG. 3

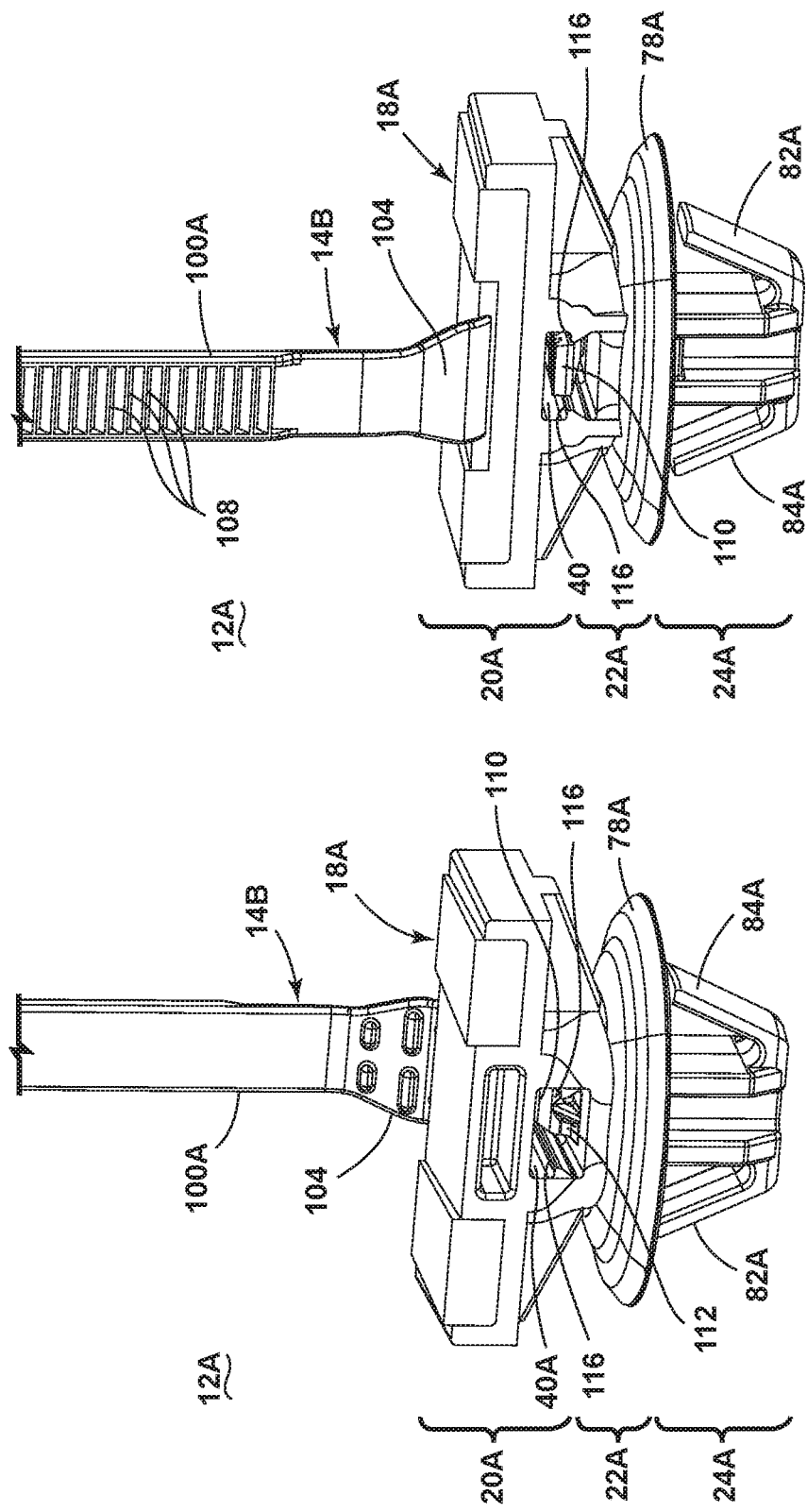

500

FASTENER FOR SECURING BUNDLED ARTICLES

FIELD OF THE INVENTION

The present disclosure generally relates to a fastener and, more specifically, to a fastener for securing a bundle of articles to a supporting structure.

DESCRIPTION OF THE RELATED ART

Hardware such as mounts and fasteners are widely used to secure bundled articles, such as wires, conduits, cables, fiber optics, etc., to a supporting structure. Such fasteners often utilize flexible ties or clamps to hold the articles in a tight, compact bundle, with the fastener holding the tied bundle to the supporting structure. However, many fasteners do not provide adequate resistance to sliding and rotation of the tie strap on the bundled article on their own. The tie and fastener tends to move axially and radially, i.e. slip or rotate, on the bundled article. To provide assurance that the fastener will stay in place on the bundled article, and to reduce slipping and rotation, a common solution is to wrap tape around the tie strap, fastener, and bundled articles, which increases weight, labor time, and cost. This problem remains challenging to current tie fastener designs.

BRIEF SUMMARY OF THE INVENTION

A fastener for securing bundled articles to a supporting surface is provided herein. In an exemplary embodiment, the fastener includes a fastener body comprising a first material and including an article mount comprising a top surface and a bottom surface and a cable tie slot below the top surface and extending transversely through the article mount, the cable tie slot adapted to receive a cable tie, and a slip-resistant pad on the article mount, the slip-resistant pad comprising a second material having a higher slip resistance than the first material, the slip-resistant pad comprising a top surface that is one of flush with and protruding beyond the top surface of the article mount. At least the top surface of the slip-resistant pad defines an article support surface on which a bundle is supportable.

An assembly comprising the fastener is also provided herein. In an exemplary embodiment, the fastener assembly includes a fastener and a cable tie.

These and other features and advantages of the present disclosure will become apparent from the following description of particular embodiments, when viewed in accordance with the accompanying drawings and appended claims.

DESCRIPTION OF THE DRAWINGS

FIG. 2 is a front perspective view of the fastener from FIG. 1;
FIG. 3 is a rear perspective view of the fastener from FIG. 1;
FIG. 8 is an enlarged front perspective view of the fastener from FIG. 7;
FIG. 9 is an enlarged rear perspective view of the fastener from FIG. 7.

DETAILED DESCRIPTION OF THE INVENTION

Figure 1:
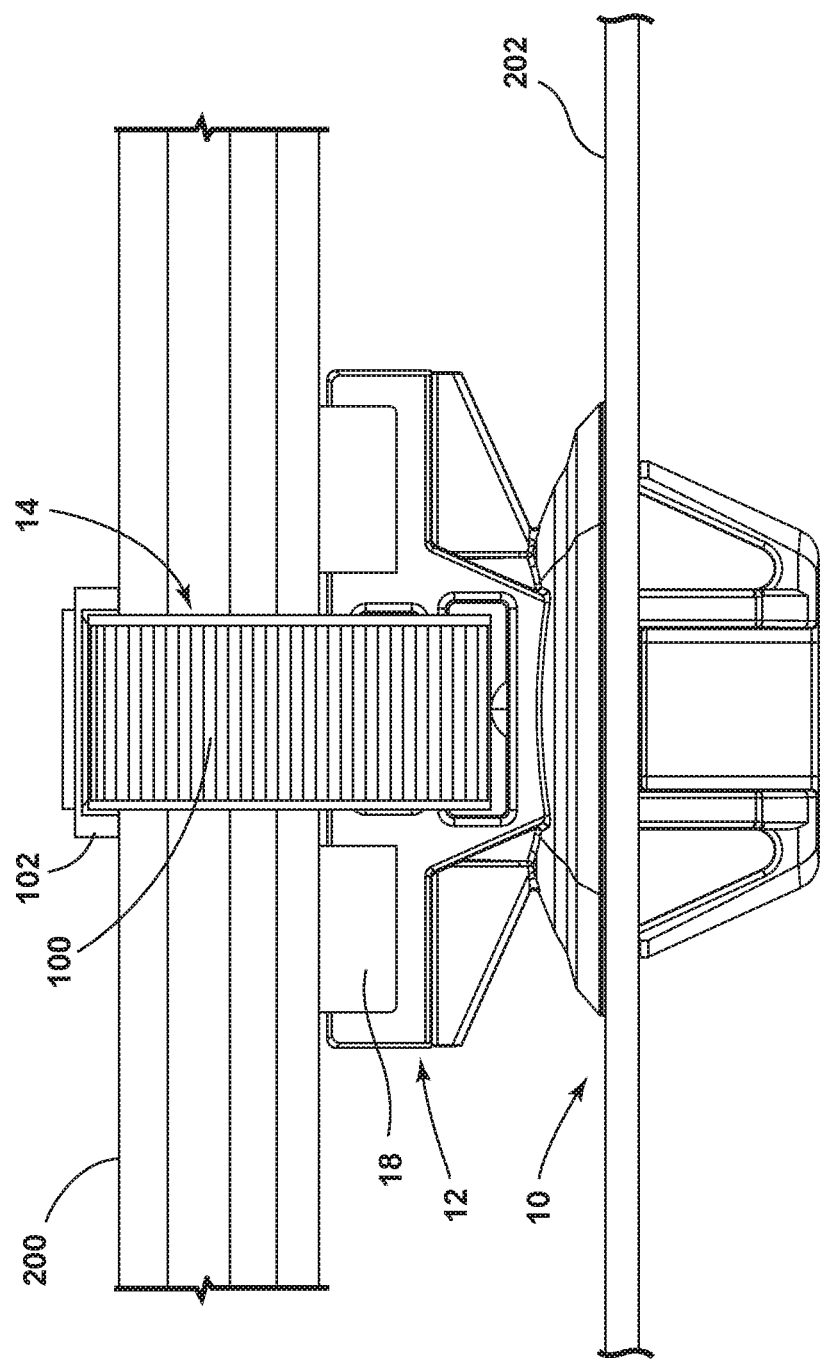
FIG. 1 is a perspective view of a fastener according to a first embodiment, showing the fastener securing a bundle to a support surface using a cable tie to capture the bundle.

A fastener assembly is described below. As will be appreciated from the description herein, the fastener has myriad end use applications but is generally used to secure a bundle of articles to a supporting surface, thus providing broad application across multiple industries. As but one example, the fastener may be used to mount a flexible tie, also referred to as a cable tie, to a supporting surface, the cable tie holding the articles in a tight, compact bundle. However, end use applications of the fastener are not so limited. At least some embodiments of the fastener provided herein functions through the various elements thereof, as described below, with a slot that can receive a generic tie, rather than a specialized tie, with the slot having a detent in the center of the slot to interface with the tie strap. At least some embodiments of the fastener provided herein functions through the various elements thereof, as described below, to increase friction with the secured bundle, thereby resisting axial movement and rotation of the bundled articles. To that end, a slip-resistant pad can be provided at the interface with the bundle.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. In addition, it is to be understood that the phraseology and terminology used herein are for the purpose of description and should not be regarded as limiting. The use of "having," "including," and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

FIG. 1 shows a fastener 12 according to one embodiment of the present invention securing a bundle 200 to a support surface 202. An elongated, flexible tie 14 is inserted into the fastener 12 and is then wrapped and secured around the bundle 200, thereby securing the bundle 200 to the support surface 202 via the fastener 12, which is mounted to the support surface 202. The bundle 200 may consist of a single article or several articles, such as wires, conduits, cables, fiber optics, or other elongated articles. Likewise, the bundle 200 may be of various sizes and yet be accommodated by the tie 14.

The fastener 12 and tie 14 together can form a fastener assembly 10. The fastener 12 can come preassembled with a cable tie 14, or can be provided separately such that any available cable tie 14 can be used with the fastener 12. The cable tie 14 can be a flexible plastic article. Other fastening members may be usable with the fastener 12 to secure a bundle to a support surface, such as a metal tie, a clamp, or another elongated fastening member.

It is noted that in FIG. 1, the bundle 200 is illustrated as a plurality of elongated articles, such as wires, conduits, cables, fiber optics, etc. In other cases, the fastener 12 is useable to hold other articles, including a single article or multiple articles, thus providing broad application across multiple industries. In automotive applications alone, the fastener 12 can be utilized to retain a cable tie against an automotive panel, with the fastener 12 inserted into and at least partially through as lot in the panel.

FIG. 2 is a perspective view of the fastener 12 from FIG. 1. The fastener 12 comprises a fastener body 16 and at least one slip-resistant pad 18 on the fastener body 16. The fastener body 16 can comprise an article support or mount 20, with the at least one slip-resistant pad 18 provided on the mount 20, a spring section 22 located below the mount 20, and an attachment section 24 extending downwardly from the mount 20 and the spring section 22. The mount 20 provides support for a bundle (e.g. bundle 200 in FIG. 1) and the slip-resistant pad 18 can comprise any material capable of friction with the bundle to resist axial movement and/or rotation of the bundle. The pad 18 can further be composed a material which will not scratch, gouge, or otherwise damage the bundled articles.

The article support or mount 20 comprises a top surface 26 and a bottom surface 28. The top surface 26 provides support for a bundle (e.g. bundle 200 in FIG. 1) and the bottom surface 28 provides an area for the spring section 22 and the attachment section 24 to extend from. In one embodiment, the mount 20 can comprise a base 29 that is integrally formed on the bottom surface 28 of the mount 20. Ribs 30 can extend along the base 29, from an upper portion of the spring section 22 to the bottom surface 28 of the mount 20, to stiffen the fastener 12.

The mount 20 can comprise one or more side surfaces extending between the top and bottom surfaces 26, 28. For example, the mount 20 can include a first side surface 32, a second side surface 34, a third side surface 36, and a fourth side surface 38 that together can define a peripheral surface of the mount 20. The embodiment of the mount 20 as shown and described has a rectangular profile when viewed from above (see FIG. 5), and accordingly the first and third side surfaces 32, 36 are elongated with respect to the second and fourth side surfaces 34, 38. Other profiles are possible, including a square profile, an H-shaped profile, a C-shaped profile, a circular profile, or an oval profile.

It should be understood that the top surface 26, bottom surface 28, and side surfaces 32-38 should not be limited to any specific orientations. If the fastener 12 were mounted to hang the bundle 200 downwardly from the support surface 202, the top surface 26 still constitutes the surface that supports the bundle 200, and would be orientated spatially below the bottom surface 28.

The fastener 12 further comprises a slot 40 through which the tie 14 is insertable to assemble the tie 14 with the fastener 12. The cable tie slot 40 is disposed below the top surface 26 and can extend transversely through the mount 20 (i.e. from first side surface 32 to third side surface 36). In one embodiment, the cable tie slot 40 can extend transversely through the base 29 of the mount 20, thereby being disposed below the bottom surface 28 of the mount 20. In another embodiment, the slot 40 can extend transversely through the portion of the mount 20 between the top and bottom surfaces 26, 28, thereby being disposed above the bottom surface 28. In yet another embodiment, the slot 40 be disposed partially above and partially below the bottom surface 28 of the mount 20.

The slot 40 can be sized to receive a variety of different ties 14, rather than a specialized or specific tie. To that end, the fastener 12 can include a detent 42 extending into the slot 40. The detent 42 engages the tie 14 when the tie 14 is inserted into the slot 40 and provides resistance and friction for the elongated tie 14 when it is assembled with the fastener 12, while allowing the tie 14 to be moved back and forth as necessary to position the tie 14 where desired within the slot 40. The detent 42 can temporarily keep the tie 14 in a certain position relative to the slot 40, while allowing the tie 14 to be released by applying force to the tie 14 itself or to the fastener 12. In cases where a cable tie with a serrated strap is used, the detent 42 can interact with the serrations on the strap of the tie 14. The detent 42 is shown as being circular or dome-shaped. However, the shape and structure may be of any arrangement that will provide the necessary resistance and friction for the tie 14.

The detent 42 can be positioned in the approximate center of the slot 40 to interface with the tie 14. In the embodiment shown, the detent 42 is provided in the center of a bottom surface 44 of the slot 40, and protrudes toward the top surface 26. In other embodiments, the detent 42 can be provided at another location to interface with the tie 14, such as on a top surface 46 of the slot 40, i.e. the lower side of the top surface 26.

Figure 4:
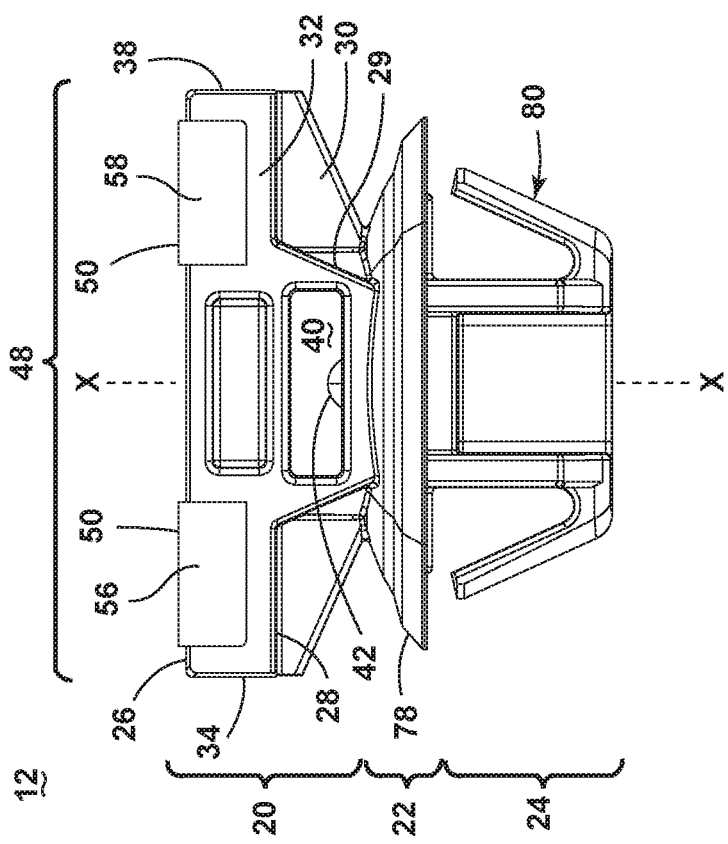
FIG. 4 is a front view of the fastener from FIG. 1.

Referring to FIG. 4, the slip-resistant pad 18 is provided on the mount 20 and can cover at least a portion of an upper side of the mount 20. The pad 18 and mount 20 can define an article support surface 48 on which a bundle (e.g. bundle 200 of FIG. 1) is supportable. In some embodiments, the pad 18 and mount 20 can together define the article support surface 48.

In one embodiment, the top surface 26 of the mount 20 and a top surface 50 of the slip-resistant pad 18 define the article support surface 48. The pad 18 can make up at least 50% of the article support surface 48, at least 60% of the article support surface 48, at least 70% of the article support surface 48, at least 80% of the article support surface 48, or at least 90% of the article support surface 48. The top surface 50 of the pad 18 can be smooth as shown, or can be ribbed or otherwise textured for increased slip-resistance.

The article supporting surface 48 can generally be planar as shown, with the slip-resistant pad 18 preventing translational movement of bundles secured to the mount 20. In another embodiment, the article supporting surface 48 can be concave or angled to provide an inwardly-directed surface, e.g. curved or angled, that can partially wrap around a bundle. For example, the article supporting surface 48 can have raised outer edges to help prevent translational movement of bundles installed on the mount 20.

The slip-resistant pad 18 can be at least partially recessed into the mount 20. The slip-resistant pad 18 can be flush with or protrude relative to the top surface 26 of the mount 20. In the embodiment shown in FIG. 4, the top surface 50 of the slip-resistant pad 18 protrudes beyond the top surface 26 of the article mount 20. One benefit of the pad 19 protruding beyond the top surface 26 of the mount is that material with higher slip resistance will be in engagement with the bundle. In another embodiment, the pad 18 can sit on top of the mount 20, with suitable attachment means such as an adhesive attaching the pad 18 to the top surface 26 of the mount 20.

Figure 5:
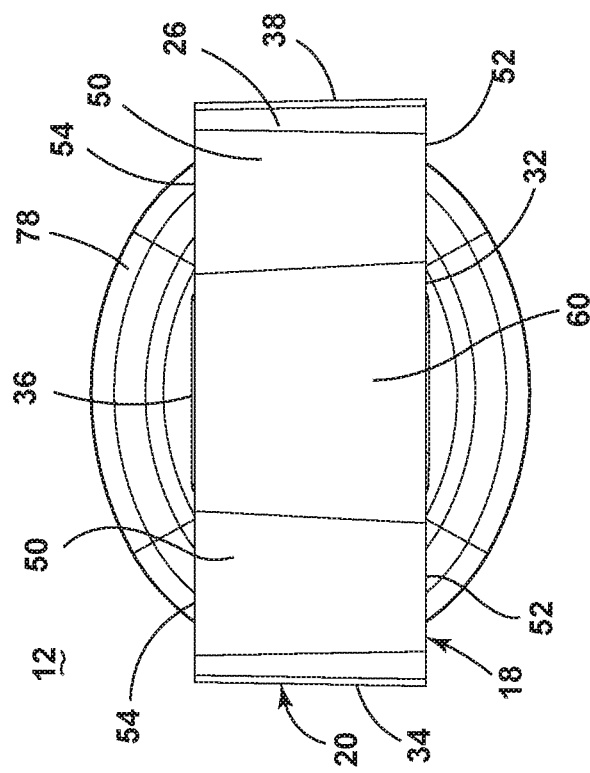
FIG. 5 is a top view of the fastener from FIG. 1.

The slip-resistant pad 18 can be flush with or protrude relative to one or more of the side surfaces 32-38 of the mount 20. Referring to FIG. 5, the slip-resistant pad 18 can include side surfaces 52, 54 extending downwardly from the top surface 50 of the pad 18, and the side surfaces 52, 54 of the slip-resistant pad 18 can be flush with the side surfaces 32, 36 of the article mount 20. The side surfaces 52, 54 of the pad 18 can be exposed, such that the side surfaces 52, 54 form an exterior of the fastener 12 at the sides thereof. Exposure of one or more of the side surfaces of the pad 18 offers more surface area for friction. At least one other surface of the pad 18 can confront a surface of the article mount 20 or another portion of the fastener body 16, e.g. are not exposed.

Figure 6:
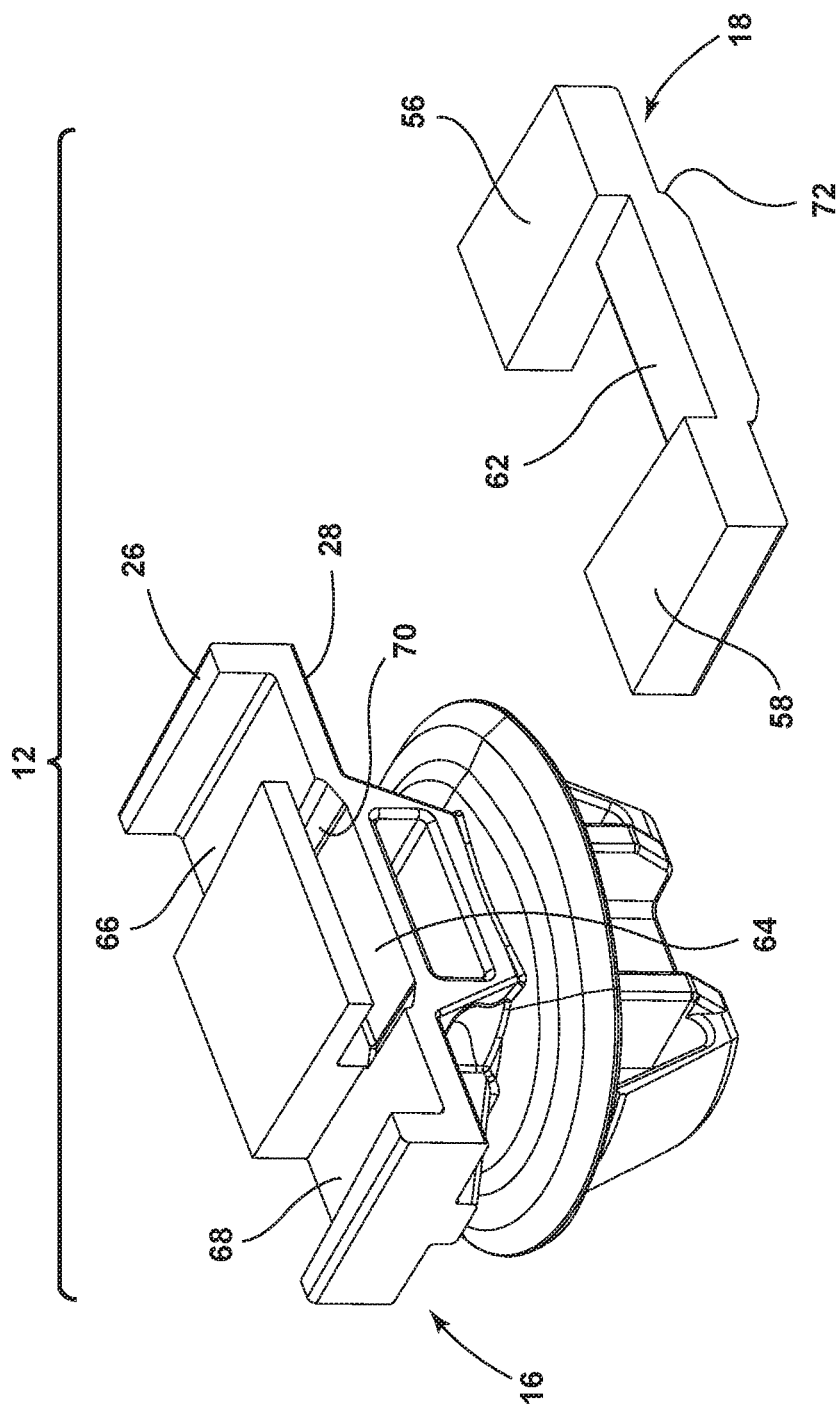
FIG. 6 is an exploded view of the fastener from FIG. 1.
Figure 7:
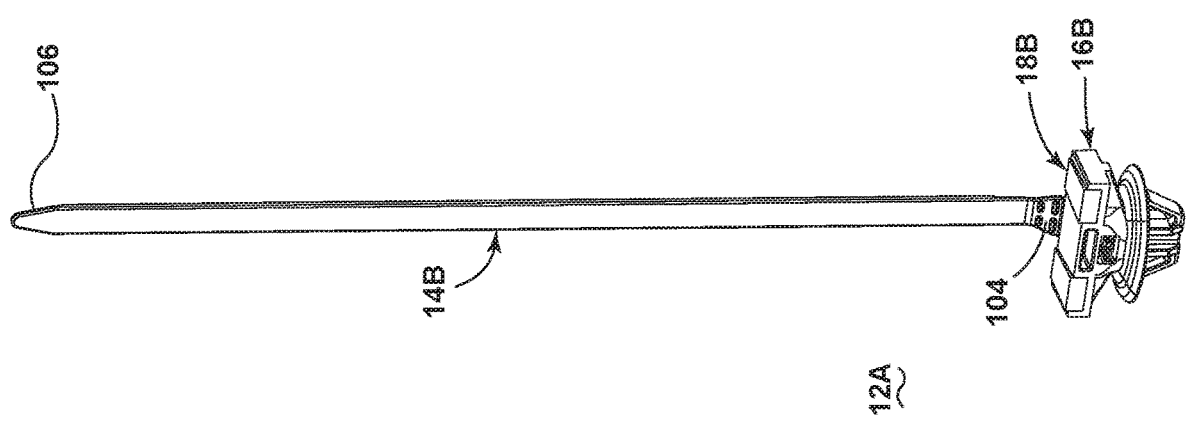
FIG. 7 is a front perspective view of a fastener according to a second embodiment.
Figure 11:
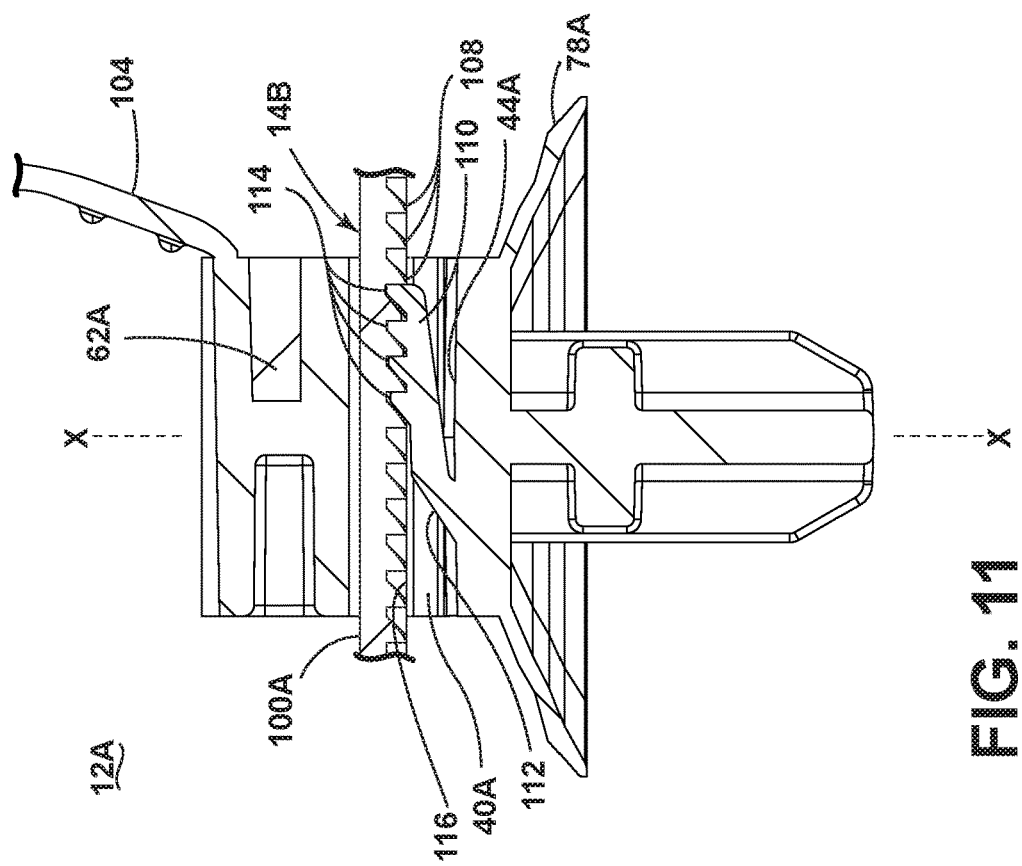
FIG. 11 is a cross-sectional view of the fastener from FIG. 7, showing a cable tie inserted through a slot of the fastener.
Figure 10:
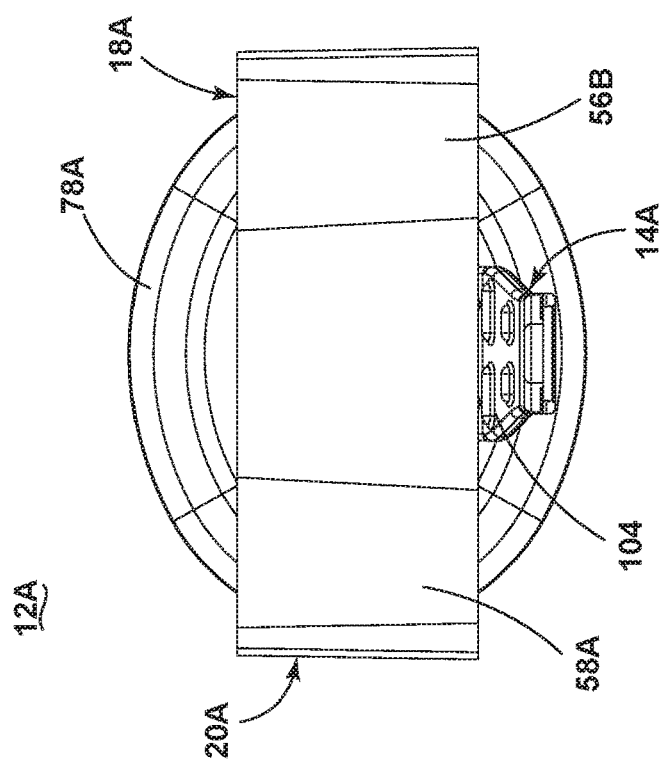
FIG. 10 is a top view of the fastener from FIG. 7.

Referring to FIG. 6, the slip-resistant pad 18 can include a first transversely extending slip-resistant pad portion 56 and a second transversely extending slip-resistant pad portion 58 spaced laterally from the first transversely extending slip-resistant pad portion 56. A central portion 60 of the top surface 26 is not covered by the pad portions 56, 58, and instead is exposed. In another embodiment, the pad 18 can cover the entire or substantially the entire top surface 26 of the mount 20.

The slip-resistant pad 18 can be generally C-shaped, with a connector 62 joining the first pad portion 56 with the second pad portion 58. The connector 62 can extend generally laterally to join with the, and can be integrally formed in one piece or otherwise joined to the pad portions 56, 58. In other embodiment, the two pad portions 56, 58 can be unconnected, such that multiple separate pieces of slip-resistance material are disposed on the fastener body 16.

The fastener body 16 can include features that help mechanically attach the pad 18 to the mount 20. In one embodiment, the mount 20 comprises a laterally-extending undercut channel 64, and the connector 62 is received in the channel 64. The undercut channel 64 can be disposed between the top and bottom surfaces 26, 28 of the article mount 20, and can open through the third side surface 36 of the mount 20. The cable tie slot 40 can be disposed below the channel 64.

The article mount 20 can include a first recess 66 and a second recess 68 extending transversely in the top surface 26 of the article mount 20. The first pad portion 56 of the slip-resistant pad 18 is disposed in the first recess 66 and the second pad portion 58 of the slip-resistant pad 18 is disposed in the second recess 68. Optionally, such as in embodiments where the pad 18 includes the connector 62 joining the pad portions 56, 58, the recesses 66, 68 can extend transversely from opposite ends of the channel 64.

The top of the recesses 66, 68 can open through the top surface 26 of the mount 20. The thickness of pad portions 56, 58 can be the same as, or greater than, the depth of the recesses 66, 68 in the mount 20, such that the top surface 50 of the pad 18 is flush with or projects beyond the top surface 26 of the mount 20. As best seen in FIG. 4, the pad portions 56, 58 of the illustrated embodiment project beyond the top surface 26 of the mount 20. The ends of the recesses 66, 68 can also open through one or more sides of the mount 20, such as the first and third side surfaces 32, 36.

The undercut channel 64 can include a depression 70, with a portion of the top surface 26 of the mount 20 overhanging the depression 70. In the case of an injection molded assembly, the depression 70 can be useful to allow a second shot material to flow into the channel 64 to form the pad 18. The slip-resistant pad 18 can accordingly have a correspondingly shaped portion 72 formed in the depression 70.

Referring to FIG. 2, the spring section 22 is generally comprised of a flexible disk or diaphragm spring 78. The diaphragm spring 78 extends downwardly and outwardly from the mount 20. The diaphragm spring 78 is shown as being a circular or conical skirt extending circumferentially about the fastener 12. However, the shape and structure may be of any arrangement that will provide the necessary resistance for the spring section 22.

The attachment section 24 can comprise any attachment structure suitable for attaching the fastener 12 to a supporting surface, such as such supporting surface 202 from FIG. 1. The attachment section 24 of the embodiment shown in FIG. 2 includes a mounting stud 80 extending downwardly from the mount 20. The mounting stud 80 has a distal end and a proximal end, the proximal end extending from the article mount 20 to the distal end, the distal end being insertable into a supporting structure, such as into a hole in the support surface 202 of FIG. 1.

The mounting stud 80 also may be considered to extend downwardly from the spring section 22. However, the diaphragm spring 78 may be arranged so that it surrounds a proximal end of the mounting stud 80 and the stud 80 does not actually depend from the spring section 22 or the diaphragm spring 78. When the mounting stud 80 is inserted into the support surface 202, the diaphragm spring 78 provides a sufficient area so that it may flex against the support surface 202 and provide a tight fitting arrangement for the fastener 12.

The mounting stud 80 can have a plurality of flexible, resilient retention fingers 82, 84 that extend outwardly relative to a longitudinal axis X of the stud 80, and serve to retain the stud 80 within the support surface 202. The fingers 82, 82 are pivotable inward, i.e. toward the longitudinal axis X, upon the application of a compression force, such as during insertion of the mounting stud 80 into the support surface 202. Upon removal of said compression force, the fingers 82, 82 pivot resiliently to return to their original state, shown in FIGS. 2-3, for example by flexing in a direction orthogonal to the transverse extension of the cable tie slot 40. The fingers 82, 84 can be aligned with each other to pivotable along coplanar paths, or can be offset from each other to be pivotable along non-coplanar paths.

The mounting stud 80 can have a pair of spaced apart, parallel arms 86, 88 that extend longitudinally out from the base 29. The arms 86, 88 also may be considered to extend downwardly from the spring section 22. Optionally, a cross-member 90 extends laterally between at least a portion of each of the arms 86, 88. Cross-member 90 can include a top edge 92 that is spaced from the bottom of the spring section 22 to define an opening through the mounting stud 80. Cross-member 90 can include a bottom edge 94 that can be generally flush with lower ends 96, 98 of the arms 86, 88.

The retention fingers 82, 84 can extend outwardly from the lower ends 96, 98 of the arms 86, 88. The fingers 82, 84 can be disposed at an oblique angle relative to the longitudinally-extending arms 86, 88, and are pivotable inward, i.e. toward arms 86, 88, upon the application of a compression force, such as during insertion of the mounting stud 80 into the support surface 202.

In some embodiments, the fastener 12 can be manufactured from a polymeric material, such as a resin. In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melaminetype); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. However, myriad materials may be used to manufacture the fastener 12, with each typically being selected as a function of availability, cost, performance/end use applications, etc. Moreover, the resins listed herein are not exhaustive of suitable materials that may be used.

In some embodiments, the slip-resistant pad 18 can specifically comprise a thermoplastic elastomer (TPE), such as polystyrene types, polyolefin types, polyurethane types, polyester types, polyamide types, polybutadiene types, polyisoprene types, fluoro types, and the like, and the fastener body 16 can specifically comprise a polyamide (PA), such as Nylon, a polyoxymethylene (POM), or a polyolefin, such as polypropylene (PP).

Preferably, the material for the pad 18 has a higher slip resistance than the material for the fastener body 16. The slip-resistance of the pad 18 may be expressed in terms of its coefficient of friction (COF). The higher the value, the more slip-resistant the pad. In various embodiments, the pad 18 is formed from a high friction material having a COF greater than that of the first material for the fastener body 16. COF generally depends on the nature of the surfaces of the fastener 12 and the bundle 200 in contact with each other. Thus, for a given bundle 200, there is one COF for the pad 18 and another for the fastener body 16. For the embodiments described herein, the slip-resistant pad 18 has a higher COF than at least the top surface 26 of the mount 20 with respect to a given bundle 200. In certain embodiments, the slip-resistant pad 18 has a higher COF than the mount 20 and/or than the fastener body 16. In one embodiment, the pad 18 can have a COF that is at least 10% greater, at specifically at least 20% greater, and more specifically at least double the COF of the material for the fastener body 16.

The fastener 12 can be made via various techniques, which is typically a function of its material. For example, the fastener 12 can be made via molding, extrusion, etc. Alternatively, the fastener 12 can be made via an additive manufacturing process, e.g. a 3-D printing process. In one embodiment, the fastener 12 can be manufacturing using two-shot molding, sometimes referred to as double injection molding, to produce the molded fastener from two different materials using a single, multi-chambered mold and a two-shot molding machine programmed to perform two injections in one cycle. In the first injection, a first nozzle injects the material for the fastener body 16 into the mold. In a second injection, optionally after rotating or repositioning the mold, a second nozzle injects the material for the slip-resistant pad 18 into the mold. With two-shot molding, the co-polymerization of hard and soft materials can be optimized to create a strong molecular bond between the fastener body 16 and the slip-resistant pad 18, resulting in a fastener 12 that can be produced efficiently, with lower cost, lower waste, and improved part integrity, As shown in FIG. 1, flexible cable tie 14 can be coupled with the fastener 12 to secure bundle 200 to the support surface 202. The cable tie slot 40 of the fastener 12 determines the orientation of the tie 14. In one embodiment, a strap 100 of the tie 14 can be fed through either open end of the slot 40 such that a head 102 of the cable tie and an end of the strap 100 protrude from opposing sides of the fastener 12. The tie 14 can then be wrapped around the bundle 200 and secured by inserting the strap 100 through the head 102. The head 102 can include a suitable retaining mechanism, such as a locking pawl or tang, which is designed to engage the strap 100 to secure the tie in a closed loop configuration. The tie strap 100 is tightened around the bundle 200 and presses the bundle 200 against the soft material of the slip-resistant pad 18.

The detent 42 in the slot 40 interfaces with the tie strap 100 to hold the tie 14 in place, for example while the fastener 12 is attached to the support surface 202 and/or while the bundle 200 is assembled. The detent 42 provides resistance sufficient to retain the tie 14 within the slot 40 under normal forces that may be encountered when attaching the fastener 12 or assembling a bundle.

In some embodiments where the tie 14 is preassembled with the fastener 12, i.e. provided as the fastener assembly 10, the detent 42 interfaces with the tie strap 100 to hold the tie 14 to the fastener 12, which can prevent loss or displacement during shipping and transport. The detent 42 provides resistance for the tie 14 sufficient to retain the tie 14 within the slot 40 under normal forces that may be encountered when moving, transporting, or shipping the assembly 10. Thus, the tie 14 and the fastener 12 may be preassembled so that they are loosely connected. The detent 42 holds the tie 14 in a ready position to allow immediate wrapping of a bundle.

FIGS. 7-11 show another embodiment of the fastener 12A. The second embodiment is similar to the first embodiment, and like elements are referred to with the same reference numeral bearing a letter A. In this embodiment, the cable tie 14A is integral with the fastener 12A.

In one embodiment, the fastener 12 has an attached cable tie strap 100A, with the slot 40A include a suitable retaining mechanism configured to engage the strap 100A to secure the tie in a closed loop configuration. The slot 40A in this embodiment thus functions in a similar manner as the head 102 described above for the first embodiment. The attached strap 100A is an elongated flexible member which is generally uniform and rectangular in cross-section, and which is designed to be received through and retained in the slot 40A. However, it is to be understood that tie may be constructed in alternative sizes and shapes, as will be understood by one of ordinary skill in the art.

The strap 100A includes a first end 104 and a second end 106. The first end 104 of strap 100A can be integrally connected to a side surface of the mount 20A, such as at the side surface 36A as shown herein, so as to render the cable tie 14A and fastener body 16A a unitary device (i.e. an integrated fastener assembly). The first end 104 of the strap 100A can generally be disposed between the pad portions 56A, 58A of the slip-resistant pad 18. The first end 104 of the strap 100A can alternatively be integrally connected to the mount 20A at another suitable location.

The second end 106 is a free end, and is insertable into the slot 40A. The strap 100A further includes a plurality of ratchet-shaped teeth 108 formed along its length, the teeth 108 adapted to be engaged by a locking pawl 110 when the strap 100A is formed into a closed loop.

The mount 20A includes the movable locking pawl, or tang, 110 which projects into the cable tie slot 40A. With the second free end 106 of the tie strap 100A inserted into slot 40A, the locking pawl 110 is adapted to engage the teeth 108 of the strap 100A to secure the tie in a closed loop configuration. The movable pawl 110 is pivotable via a hinge 112 connecting the pawl 110 to the bottom surface 44A of the slot 40A. The pawl 110 is movable in to and fro, or toward and away from the bottom surface 44A. The design, e.g., shape, configuration, etc., of the pawl 110 and hinge 112 may be varied from the illustrated design, as will be understood by one of ordinary skill in the art.

The pawl 110 has a plurality of ratchet-shaped pawl teeth 114 formed along its length and arranged crosswise with respect to pawl 110, e.g. in a lateral direction. The pawl teeth 114 are configured for engaging the strap teeth 108 when the strap 100A has been inserted into the slot 40A (see FIG. 11).

Optionally, the slot 40A can include rails 116 extending transversely along opposing side walls of the slot 40A. The rails 116 are configured to accommodate and guide the strap 100A in and through the mount 20. When insertion of the strap 100A through the slot 40A, the rails 116 direct the strap 100A toward and along an upper side of the slot 40A to help guide the strap 100A up and over the pawl 110.

Preferably, fastener body 16A is manufactured of a polymeric material, such as a resin, and is formed as a single piece with the cable tie 14A, using conventional molding or additive manufacturing techniques. The slip-resistant pad 18A can be formed from a different material having higher slip resistance as described previously. Suitable examples of materials for the fastener body 16A and pad 18A are listed above with respect to the first embodiment.

Figure 12:
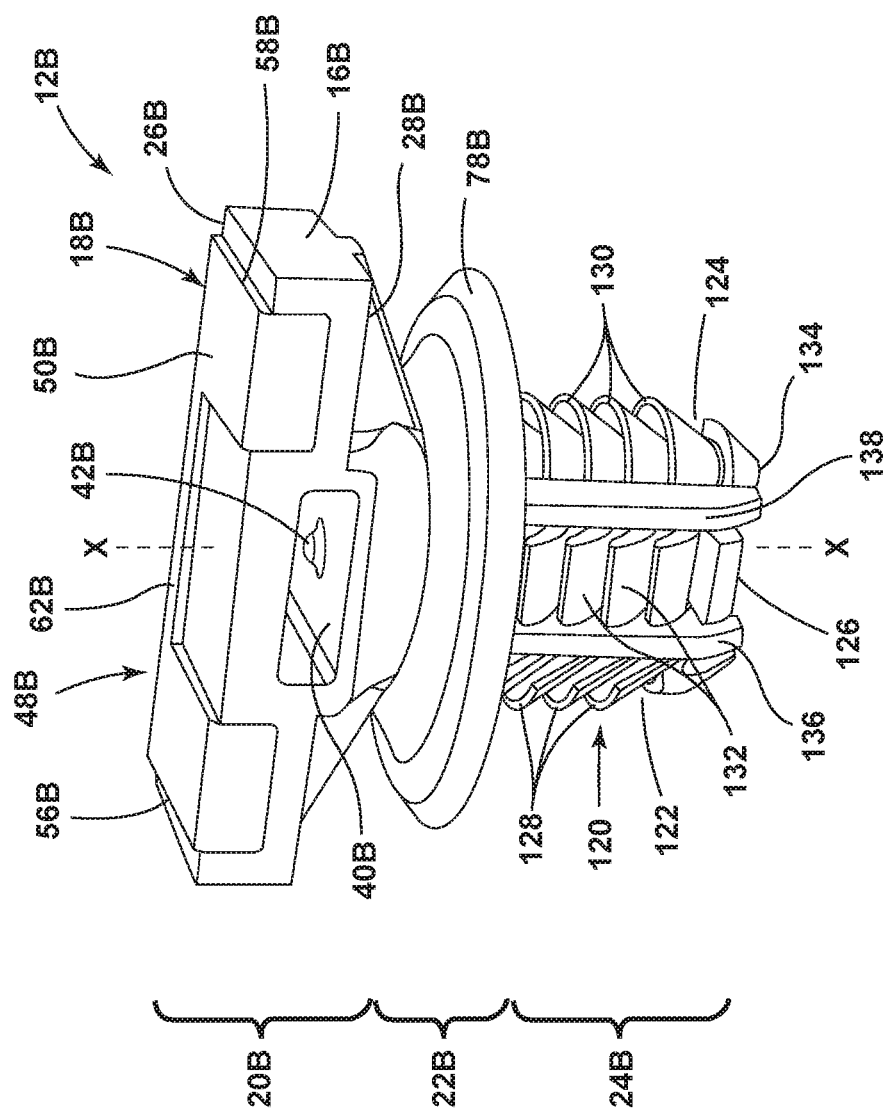
FIG. 12 is a front perspective view of a fastener according to a third embodiment.

FIG. 12 shows yet another embodiment of the fastener 12B. The third embodiment is similar to the previous embodiments, and like elements are referred to with the same reference numeral bearing a letter B. In this embodiment, the attachment section 24B has a fir tree or a Christmas tree mounting stud 120.

The mounting stud 120 has a distal end and a proximal end, the proximal end extending from the article mount 20B to the distal end, the distal end being insertable into a supporting structure, such as into a hole in the support surface 202 of FIG. 1. The mounting stud 120 can have three sections: a first lateral section 122, a second lateral section 124, and a center section 126 located intermediate of the first and second lateral sections 122, 124. The three sections are substantially coextensive with the lengthwise dimension of the mounting stud 120.

The mounting stud 120 has a plurality of extensions or branches 128, 130, 132 extending respectively from the first lateral section 122, the second lateral section 124, and the center section 126, e.g. in a fir tree configuration. The branches 128, 130, 132 are longitudinally spaced from one another and are tapered upwardly towards the mount 20B. The branches 128, 130, 132 may be evenly or unevenly spaced along their respective section, and may be aligned or staggered relative to each other. In use, the mounting stud 120 is inserted into a support surface, such as the support surface 202 of FIG. 1, and the branches 128, 130, 132 grab the supporting surface 202 to retain the fastener 12 thereto. The lowermost end of the mounting stud 120 may be configured as a pilot branch 134 having smaller diameter than the upper branches 128, 130, 132 and that helps align the mounting stud 120 with respect to the support surface for insertion within a hole in the support surface.

A first longitudinally-extending rib 136 can separate the first lateral section 122 from the center section 126, and a second longitudinally-extending rib 138 can separate the second lateral section 124 from the center section 126. Likewise, the ribs 136, 138 separate the center branches 132 from the other branches 128, 130.

The slip-resistant pad 18B of this embodiment also covers a greater portion of the upper side of the mount 20B. For example, the connector 62B can be exposed on the upper side of the mount 20B, such that the transversely extending pad portions 56B, 58B and laterally-extending connector 62B collectively define the top surface 50B of the pad 18B. Thus, in this embodiment, the pad 18B may make up a greater portion of the article support surface 48B.

Figure 14:
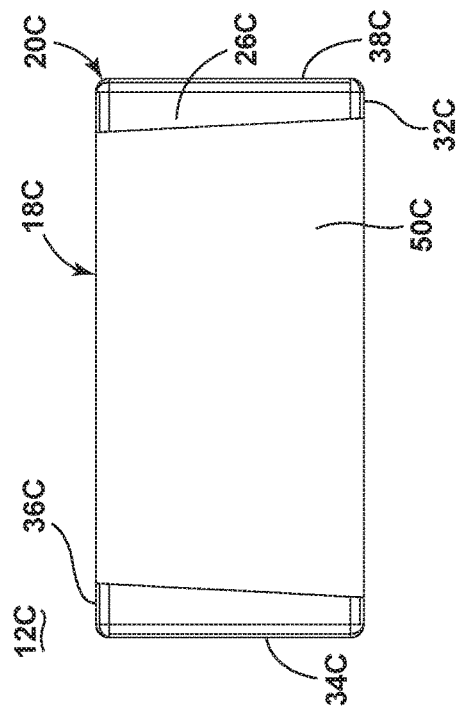
FIG. 14 is a top view of the fastener from FIG. 13.
Figure 13:
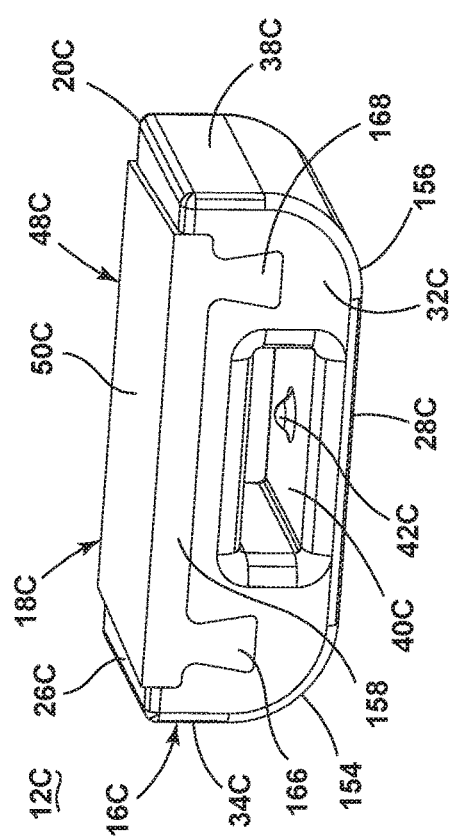
FIG. 13 is a front perspective view of a fastener according to a fourth embodiment.
Figure 15:
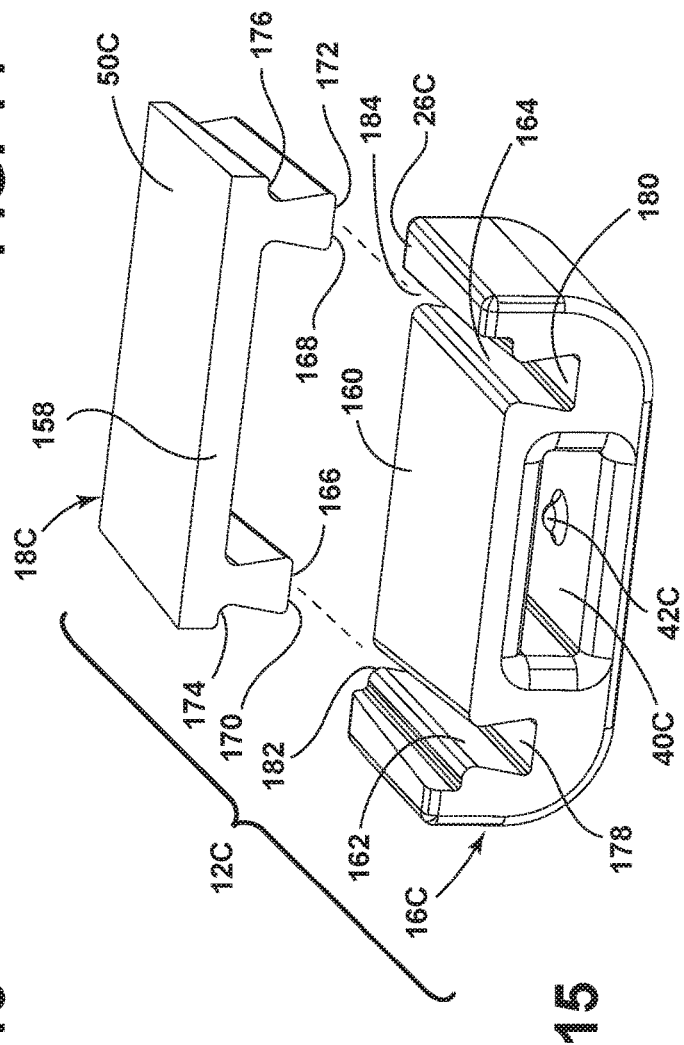
FIG. 15 is an exploded view of the fastener from FIG. 13.

FIGS. 13-15 show still another embodiment of the fastener 12C. The fourth embodiment is similar to the previous embodiments, and like elements are referred to with the same reference numeral bearing a letter C. In this embodiment, the fastener 12C includes a simplified fastener body 16C. Unlike previous embodiments, the fastener 12C does not have an attachment section to secure the fastener 12C to a supporting surface. Like previous embodiments, the fastener 12C is configured to receive a cable tie (not shown) through slot 40C in order to wrap and secure a bundle, and includes a slip-resistant pad 18C provided on the mount 20C that resists axial movement and/or rotation of a bundle secured to the mount 20C. As but one example, the fastener 12C may be used with a flexible tie that is attached directly to a supporting surface.

The mount 20C can include a substantially flat or planar bottom surface 28C to provide the mount 20C with a low-profile shape that can lie closely against bundled articles. The mount 20C can have corners 154, 156 between the bottom surface 28C and side surfaces 34C, 38C that are rounded, beveled, or otherwise shaped to avoid snagging.

The slip-resistant pad 18C of this embodiment also covers a greater portion of the upper side of the mount 20C. For example, the slip-resistant pad 18C can include a slip-resistant pad portion 158 that defines the article support surface 48C. The pad portion 159 can cover at least 70% of the top surface 26C, at least 80% of the top surface 26C, at least 90% of the top surface 26, or at least 95% of the top surface 26C.

Referring to FIG. 15, the fastener body 16C can include features that help mechanically attach the pad 18C to the mount 20C. In one embodiment, the mount 20 comprises a laterally-extending channel 160 and one or more transversely-extending grooves 162, 164 in the channel 160. The pad portion 158 is received in the channel 160. The channel 160 can be disposed in the top surface 26C of the article mount 20C, and the pad portion 158 is disposed in the channel 160. The pad portion 158 can be partially recessed in the top surface 26C, with the top surface 50C of the pad 18C projecting beyond the top surface 26C of the mount 20C.

The slip-resistant pad 18C can include a first leg 166 and a second leg 168 extending downwardly relative to the top surface 50C of the pad 18C. The legs 166, 168 can project from a lower side of the pad portion 158, and run in the transverse direction. The article mount 20C can include a first groove 162 and a second groove 164 extending transversely in the top surface 26C of the article mount 20C. The grooves 162, 164 can be spaced on either side of the slot 40A, and generally run alongside the slot 40A. Each leg 166, 168 of the slip-resistant pad 18C is disposed in one of the grooves 162, 164.

In at least some embodiments, the legs 166, 168 and grooves 162, 164 can form dovetail joints for durability of the fastener 12. In the embodiment shown, the legs 166, 168 are generally dovetailed, e.g. have a dovetail shape, and are thus broader at their free ends 170, 172 than at their base 174, 176 connected to the pad portion 158. The grooves 162, 164 can correspondingly be wedge-shaped, and are thus broader at their bottom ends 178, 180 that at their top openings 182, 184.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A fastener for securing a bundle to a supporting structure, the fastener comprising:
    a fastener body comprising a first material and including:
        an article mount comprising a top surface and a bottom surface; and
        a cable tie slot below the top surface and extending transversely through the article mount, the cable tie slot adapted to receive a cable tie; and
    a slip-resistant pad on the article mount, the slip-resistant pad comprising a second material having a higher slip resistance than the first material, the slip-resistant pad comprising a top surface that is one of flush with and protruding beyond the top surface of the article mount;
    wherein at least the top surface of the slip-resistant pad defines an article support surface on which a bundle is supportable; and
    wherein the article mount comprises side surfaces extending between the top and bottom surfaces thereof, the slip-resistant pad comprises side surfaces extending downwardly from the top surface of the slip-resistant pad, and wherein the side surfaces of the slip-resistant pad are flush with the side surfaces of the article mount.

2. The fastener of claim 1, wherein the top surface of the slip-resistant pad protrudes beyond the top surface of the article mount.

3. The fastener of claim 1, wherein the slip-resistant pad comprises a first transversely extending slip-resistant pad portion and a second transversely extending slip-resistant pad portion spaced laterally from the first transversely extending slip-resistant pad portion.

4. The fastener of claim 3, wherein the slip-resistant pad comprises a laterally-extending connector joining the first transversely extending slip-resistant pad portion with the second transversely extending slip-resistant pad portion.

5. A fastener for securing a bundle to a supporting structure, the fastener comprising:
    a fastener body comprising a first material and including:
        an article mount comprising a top surface and a bottom surface; and
        a cable tie slot below the top surface and extending transversely through the article mount, the cable tie slot adapted to receive a cable tie; and
    a slip-resistant pad on the article mount, the slip-resistant pad comprising a second material having a higher slip resistance than the first material, the slip-resistant pad comprising a top surface that is one of flush with and protruding beyond the top surface of the article mount;
    wherein at least the top surface of the slip-resistant pad defines an article support surface on which a bundle is supportable;
    wherein the slip-resistant pad comprises a first transversely extending slip-resistant pad portion and a second transversely extending slip-resistant pad portion spaced laterally from the first transversely extending slip-resistant pad portion; and
    wherein the slip-resistant pad comprises a laterally-extending connector joining the first transversely extending slip-resistant pad portion with the second transversely extending slip-resistant pad portion;
    wherein the article mount comprises a laterally-extending channel, disposed between the top and bottom surfaces of the article mount, and the connector is received in the channel.

6. The fastener of claim 5, wherein the cable tie slot is below the channel.

7. The fastener of claim 5, wherein the article mount comprises a first recess and a second recess extending transversely in the top surface of the article mount, the first and second recesses extending transversely from opposite ends of the channel, wherein the first transversely extending slip-resistant pad portion of the slip-resistant pad is disposed in the first recess and the second transversely extending slip-resistant pad portion of the slip-resistant pad is disposed in the second recess.

8. A fastener for securing a bundle to a supporting structure, the fastener comprising:
    a fastener body comprising a first material and including:
        an article mount comprising a top surface and a bottom surface; and
        a cable tie slot below the top surface and extending transversely through the article mount, the cable tie slot adapted to receive a cable tie; and a slip-resistant pad on the article mount, the slip-resistant pad comprising a second material having a higher slip resistance than the first material, the slip-resistant pad comprising a top surface that is one of flush with and protruding beyond the top surface of the article mount;

wherein at least the top surface of the slip-resistant pad defines an article support surface on which a bundle is supportable; and wherein the slip-resistant pad comprises a first leg and a second leg extending downwardly relative to a top portion of the slip-resistant pad, and the article mount comprises a first groove and a second groove extending transversely in the top surface of the article mount, wherein the first leg of the slip-resistant pad is disposed in the first groove and the second leg of the slip-resistant pad is disposed in the second groove.

9. The fastener of claim 8, wherein the first and second legs are dovetailed.

10. The fastener of claim 8, wherein the top portion of the slip-resistant pad lies in a channel extending laterally between grooves.

11. The fastener of claim 1, comprising a detent extending into the cable tie slot and configured to engage a cable tie when the cable tie is inserted into the cable tie slot and provide resistance and friction to the cable tie.

12. The fastener of claim 11, wherein the detent projects from a bottom surface of the cable tie slot and protrudes toward the top surface of the article mount.

13. The fastener of claim 1, wherein the cable tie slot is disposed between top and bottom surfaces of the article mount.

14. The fastener of claim 1, comprising a cable tie integrally formed with the article mount, the cable tie comprising a strap having a first end connected to the article mount and a second free end insertable into the cable tie slot.

15. The fastener of claim 14, comprising wherein the article mount comprises a movable locking pawl projecting into the cable tie slot and adapted to engage the cable tie to secure the cable tie in a closed loop configuration.

16. The fastener of claim 1, comprising a mounting stud having a distal end and a proximal end, the proximal end extending from the article mount to the distal end, the distal end being insertable into the supporting structure.

17. The fastener of claim 16, wherein the mounting stud comprises one of:
 a plurality of flexible, resilient retention fingers that extend outwardly relative to a longitudinal axis of the mounting stud and serve to retain the mounting stud within the supporting structure; and
 a plurality of branches extending in a fir tree configuration, the plurality of branches tapered upwardly in a direction towards the article mount.

18. The fastener of claim 1, comprising a flexible diaphragm spring extending downwardly and outwardly from the article mount.

19. The fastener of claim 1, wherein the first material is Nylon and the second material is a thermoplastic elastomer.

* * * * *